Feb. 27, 1968    J. V. STONG    3,370,409
TREE CROP HARVESTING MACHINES AND CONNECTORS
FOR LINKING THE SAME TOGETHER
Filed Dec. 14, 1964    2 Sheets-Sheet 1
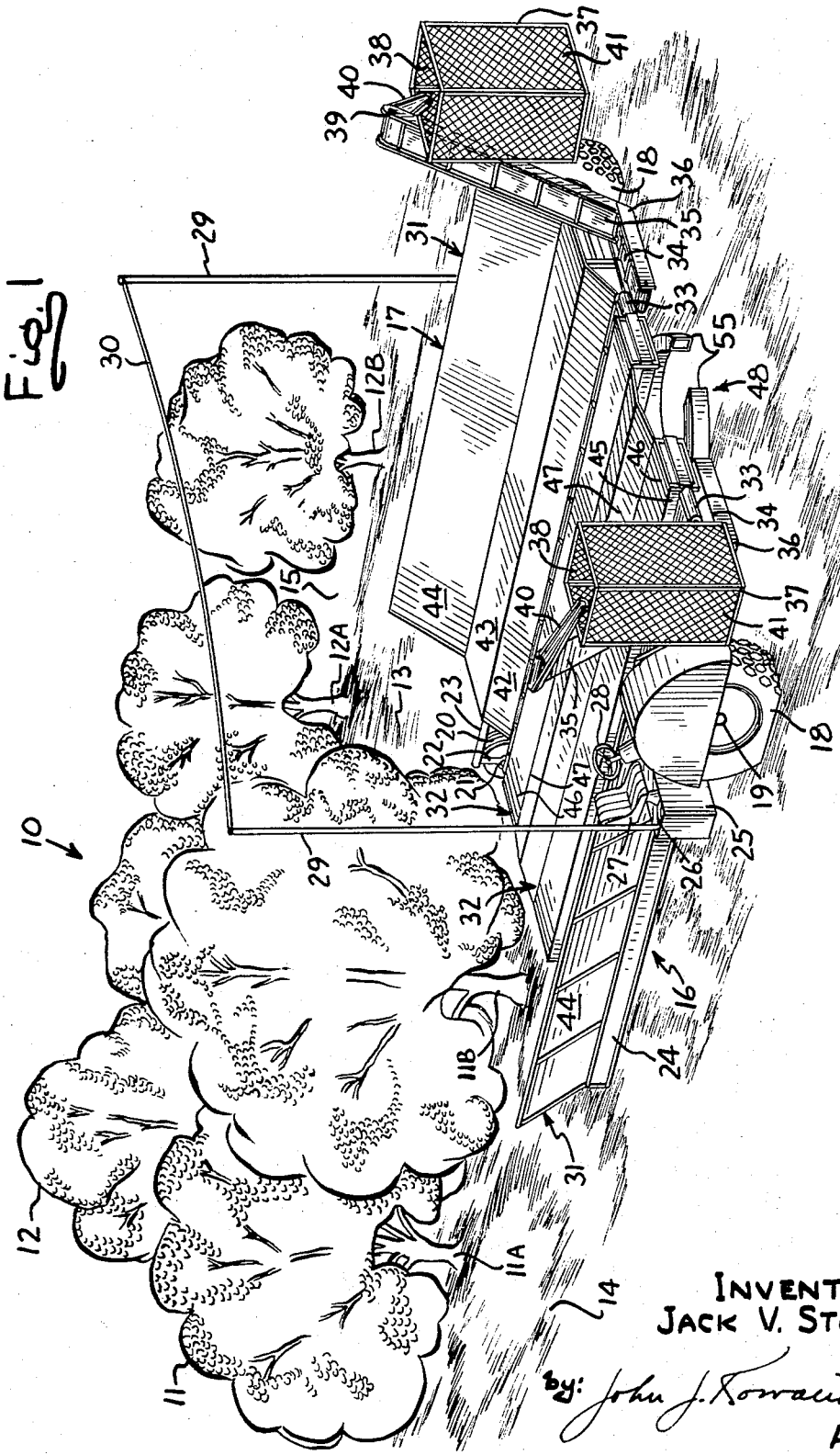
INVENTOR
JACK V. STONG
by: John J. Kowalik
ATTY.

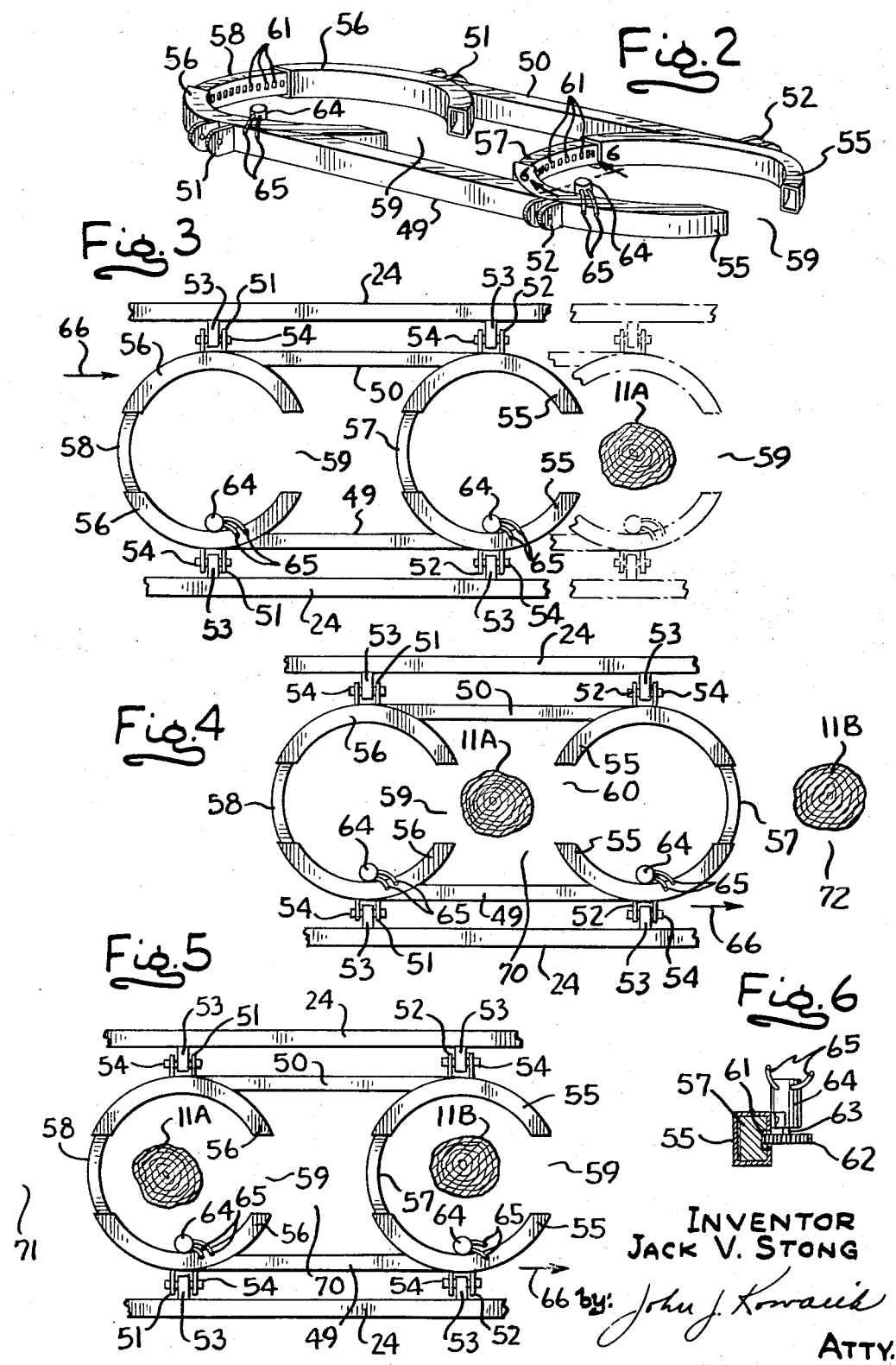

United States Patent Office 3,370,409
Patented Feb. 27, 1968

3,370,409
TREE CROP HARVESTING MACHINES AND CONNECTORS FOR LINKING THE SAME TOGETHER
Jack V. Stong, Neosho, Mo., assignor to International Harvester Company, Chicago, Ill., a corporation of Delaware
Filed Dec. 14, 1964, Ser. No. 418,023
15 Claims. (Cl. 56—328)

ABSTRACT OF THE DISCLOSURE

A fruit harvester having a pair of components embracing a tree and couplings connecting the components and serially separable and reconnectible as the harvester passes by the trees to accommodate passage of trees between these components.

---

The instant invention relates to tree crop harvesting machines. Particularly it relates to improvements in such machines for linking pairs thereof together.

It is conventional practice in commercial harvesting of fruits and nuts to surround a crop bearing tree with a crop catching web and shake the tree to loose the crop which is caught in the web and then removed therefrom by diverse means. After a tree has been freed from available crop, a catching web will be taken up and advanced to another tree harvesting position. Webs may be carried on motorized vehicles, a pair of which act as a harvesting unit, each going down an aisle on opposite sides of a row of trees. Adjacent a tree to be harvested, a crop catching web is extended from each vehicle so that a pair thereof are extended from opposite sides toward the same tree. In conventional operation of vehicles of the described class, an operator is required for each vehicle of a pair which is to be employed as a unit to encircle a tree.

Crop catching webs conventionally are fabricated from a yieldable or elastomerized material, such as rubberized canvas, to enable a web to conform to its half of a tree. Thereby, when a pair of webs are extended from their respective vehicles, they will completely encircle a tree the crop from which is to be harvested.

Frequently, a mechanical tree shaker may be employed to shake loose crop being harvested. The shaker may be mounted on and automatically powered by means connected to the vehicles which are employed. Because vehicles of the class described are poorly balanced, there is a hazard that a harvester vehicle will tip under the jolting or jarring mechanical shaking action with consequent likelihood of injury to such vehicles, its operator, or loss of time in righting the vehicle and re-setting it in fruit catching position. Should only disalignment occur, time-consuming realignment or proper re-positioning will be required. Furthermore, accompanying mere disalignment of catching webs is spillage therefrom of crop already caught, with resultant fruit bruising and costly spilled fruit recovery.

The foregoing problems could be obviated by providing a better balanced harvesting unit which would hold its position once disposed with respect to a thereby to be harvested tree.

It is an object of the instant invention to provide an improved machine for harvesting tree crops and the like.

It is another object of the instant invention to provide a device for harvesting tree crops and the like which is adapted to be linked with an accompanying device to encircle a tree and each device to balance the other with respect to the forces encountered in tree crop harvesting.

It is additionally an object of the instant invention to provide an improved device for harvesting tree crops and the like adapted to be used together with a like device which are mechanically linked together to function as a single unit.

A further object of the instant invention is the provision of a novel connector for linking together a pair of fruit harvesting machines.

A still further object of the instant invention is the provision in the connector of means to permit linked together vehicles of a harvester unit to pass on opposite sides of a row of trees while retaining their connection together.

Yet another object of the instant invention is the provision of a tree crop harvester comprising a pair of vehicle members disposed on opposite sides of an aisle, and having means bridging said aisle to connect the vehicle members together and withdrawable from the aisle to permit the vehicle members to pass on opposite sides of a row of trees while continuously maintaining connection between both vehicle members.

Additionally, it is an object of the invention to provide a circling connector means linking a pair of vehicle members of the described class, whereby a tree may be passed between said members longitudinally of the path of movement of the thusly paired vehicles while maintaining the linkage.

It is a yet further object of the instant invention to provide novel means whereby a single operator can operate throughout an orchard a pair of connected together vehicles adapted to encircle a plurality of successive trees to harvest a crop therefrom.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a view in perspective of an embodiment of the instant invention in an orchard setting.

FIG. 2 is a perspective view of the novel connector mechanism.

FIG. 3 is a plan view of the connector mechanism, parts being shown dotted for the purpose of illustration.

FIG. 4 is a view similar to FIG. 3 but showing the parts in another phase.

FIG. 5 is a view similar to FIG. 3 but showing the parts in yet another phase.

FIG. 6 is a sectional view taken substantially on the line 6—6 of FIG. 2 and looking in the direction of the arrows.

Referring now more particularly to the drawings, there is shown an orchard generally designated as 10. The orchard comprises two elongated straight rows of trees 11 and 12, with the rows 11 and 12 being parallel to each other and spaced apart to form an aisle 13 therebetween. On the opposite side of the row of trees 11 is an aisle 14, and on the opposite side of the row 12 is an aisle 15, as illustrated in FIG. 1. To facilitate description, the trees in row 11 are designated 11A and 11B, whereas the trees in aisle 12 are designated 12A and 12B.

Conventionally, as the orchard would be harvested, assuming that harvesting was begun with row 11, a pair of tree harvesting vehicles would be disposed in aisles 13 and 14, respectively, and from opposite sides of row 11 and acting together they would successively encircle trees 11A and 11B to harvest the crop. After harvesting of tree 11A, for example, were completed, the vehicles would be then moved to tree 11B. Conventionally, different operators would be required to align and re-align the vehicles with respect to each other and to the various trees 11A, 11B, and so on, until all of the trees in the row 11 were harvested. Thereafter, the pair of vehicles would be moved to the next row of trees 12, for example, and the procedure would be repeated.

In accordance with the instant invention, there are also employed a pair of vehicles. They are designated generally by the numerals 16 and 17, as illustrated in FIG. 1. Vehicles 16 and 17, except as otherwise noted, are of substantially the same construction except their parts are reversed; that is to say, said vehicles bear a mirror image relationship to each other. Therefore, for example, with respect to the outer traction wheels 18, that which is on the right hand vehicle 16 is on the right side, while that which is on the left hand vehicle 17 is on the left side.

The frame 24 of each vehicle 16 and 17 is supported on the outer forward enlarged traction wheel 18 which is mounted on a front axle 19 suitably journalled in the frame of its respective vehicle. Each of vehicles 16 and 17 also has an inner traction wheel (not shown). Such inner traction wheel is of low profile with a radius substantially less than that of the traction wheel 18. The unseen traction wheel is disposed on a side of its frame opposite and toward the front in alignment with the traction wheel 18 on the same vehicle. At the rear, each frame of the vehicles 16 and 17 is supported on a steerable wheel 20 which is mounted on an axle or pin 21 journalled in an axle carriage 22 supported by a vehicle frame extension 23, as illustrated in FIG. 1. The steerable wheel 20 is preferably disposed midway between the longitudinal extensions of forward traction wheels 18 and the unseen front traction wheel heretofore described.

The vehicle framework 24 is elongated, and on its forward end portion carries a laterally extending casing 25 in which various controls may be mounted. An upper flat 26 of the casing 25 supports an operator's seat 27 disposed behind the large traction wheel 18 and from which an operator can guide the vehicle through the manipulation of a conventional steering wheel mechanism 28, as illustrated in FIG. 1.

The vehicle 17 need not be provided with its own operator controls as the combined vehicles 16 and 17 when coupled together in a manner to be hereafter described are operable as a single unit by one operator through employment of any of various remote control means well known in the art for transmitting power from the vehicle 16 to the vehicle 17. One such means may include a pair of vertical masts 29 of sufficient height to clear orchard 10 and the lower ends of which are supported by the respective vehicles 16 and 17. Masts 29 provide the means for supporting power lines and the like 30 which extend from the operator-managed vehicle 16 to the passive or remotely controlled vehicle 17, whereby the power driven parts on the vehicle 17 may be controlled and driven from vehicle 16.

Each of the vehicles 16 and 17 comprises a pair of elongated static conveyor constructions generally designated 31 and 32, respectively, and disposed on opposite sides of and adapted to deliver crop to an elongated power driven rubber flight conveyor 33 which extends longitudinally of its respective vehicle, and is adapted to move crop to the front. A driven transverse conveyor 34, which is supported by each framework 24 adjacent the front end of and slightly below its longitudinal conveyor 33, is adapted therefrom to receive crop and carry it to the receiving end of a driven elevator 35.

Each elevator 35 extends angularly upwardly from the lateral end of an associated conveyor 34 in a common conveyor framework 36 which is rigidly secured to an associated vehicle frame 24. A container, such as a large replaceable basket, is supported with its upper receiving openings 38 disposed spaced below the upper delivery end 39 of each elevator 35. A chute 40 which is connected to the framework 36 adjacent the delivery end 39 is disposed angularly downwardly therefrom into the orifice 38 of the basket 37 to deliver fruit and the like 41 from the conveyor 35 into the basket 37 in the manner illustrated in FIG. 1.

Each outer static conveyor construction 31 is disposed adjacent and along the outside of its respective longitudinal conveyor 33, and comprises three elongated longitudinally disposed rectangular sections 42, 43 and 44 of equal length which are disposed side by side, as illustrated in FIG. 1. The outermost section 44 may be secured in adjustably pivoted positions on the frame 24 by suitable means (not shown) to the end that a suitable fruit catching angle can be assumed or to enable folding of section 44 downwardly or inwardly against the section 43 to minimize space requirements when the device is not being used or being moved from one location to another. The section 43 of each outer conveyor construction 31 is disposed between associated sections 42 and 44 with which it is co-extensive on its opposite sides. Each section 43 is carried on its frame 24 and may slope slightly downwardly as it extends inwardly to cause the crop to roll toward longitudinal conveyor 33. Each innermost section 42 also slopes inwardly and downwardly from its outer side portion at which it is connected to or adjacent a medial section 43.

The inner static conveyor construction 32 of each vehicle 16 and 17 may also comprise three elongated longitudinally disposed substantially rectangular sections 45, 46 and 47, of equal length. The medial sections 46 of the inner static conveyor constructions 32 may slope downwardly and inwardly toward conveyors 33, respectively. Along opposite sides of each medial section 46 there are disposed sections 45 and 47, respectively. The innermost section 45 may slope sharply downwardly and inwardly toward its associated conveyor 33. The outermost section 47 of each inner static conveyor construction 32 has an outer edge portion which is preferably of elastomer fabrication, such as rubber or rubberized canvas, and is rockably mounted to move upwardly from the position illustrated in FIG. 1 by any suitable means (not shown). Because of its elastomerized fabrication, a pair of sections 47 of vehicles 16 and 17 disposed on opposite sides of a tree are able completely to encircle a tree and form a continuous web or apron snugly engaging the trunk of an encircled tree and thereby obviate crop spillage between a tree and encircling web.

The longitudinal elongated conveyor 33 is disposed below the level or at the lowest level of the static conveyors 31 and 32 so that the crop will roll down and be conveyed by the static conveyors because of the inclination of their surfaces to the longitudinal conveyor 33 from which it is carried to its respective transverse conveyor 34 as in the manner heretofore described. The static conveyors 31 and 32 in the illustrated embodiment of the invention are shown as being the same length as the elongated conveyor 33.

A connector generally designated by numeral 48 releasably secures vehicles 16 and 17 together and permits the vehicles in connected or linked together position to travel along aisles 14 and 13, respectively. Thereby, the relative position of the vehicles can be maintained, and only a single operator is required to operate both vehicles 16 and 17. The details of construction of the connector 48 and the manner in which it operates are illustrated in FIGS. 2–6, inclusive.

As illustrated in FIGS. 2–5, inclusive, the connector 48 comprises a pair of parallel spaced apart mounting rods or arms 49 and 50 which are of rigid construction and the longitudinal axes of which extend, when mounted, longitudinally of the vehicles 16 and 17. Each of the arms 49 and 50 has a plurality of outwardly extending apertured ears or the like which are arranged in spaced apart pairs 51 and 52 and adapted for disposition about and connection by pins 54 to apertured lugs or bosses 53 which may be integral with or rigidly carried by portions of the frames 24 of respective vehicles 16 and 17. Accordingly, each of the vehicles 16 and 17 has secured thereto one of the rods or arms 49 and 50. In this description, it may be assumed that the vehicle 16 carries the rod or arm 49, and that the vehicle 17 carries the rod or arm 50.

Each of the arms 49 and 50 has secured to the inner facing portion thereof a plurality of arcuate or curved tubes or conduits 55 and 56 which may be rectangular in cross section and which have the same radii of curvature. Each of the tubes or conduits 55 and 56 is less than half a circular segment disposed with its concavity facing an opposite vehicle and in a position opposed to a like of the tubes or conduits 55 and 56. Accordingly, vehicles 16 and 17 can be adjusted to dispose each of the conduits 55 and 56 in alignment with a like of the conduits 55 and 56 to provide pairs of spaced apart segments which fall in a plurality of circles spaced longitudinally of the path of vehicle movement, as illustrated in FIGS. 2, 3, 4 and 5. In the drawings, tubes or conduits 55 are paired with each other, and tubes or conduits 56 are paired with each other.

An arcuately shaped link, gate or C-shaped member 57 whose radius of curvature is substantially the same as that of tubes or conduits 55 may be adjustably mounted in both thereof simultaneously in the manner illustrated in the drawings. An arcuately shaped link, gate, or C-shaped member 58, having substantially the same radius of curvature as that of tubes or conduits 56, may be adjustably mounted in both thereof simultaneously. The lengths of the gates or links 57 and 58 are perferably such that when an inlet opening 59 between pairs of tubes 55 or 56 is completely closed, the outlet opening 60 for the coresponding pair of tubes or conduits will be open. Furthermore, to permit separation of vehicles 16 and 17, the lengths of the gates or links 57 and 58 may be such that both of the openings 59 and 60 of an associated pair of the tubes 55 and 56 can be opened simultaneously.

As illustrated in FIGS. 2 and 6, the gates or links 57 and 58 have a plurality of regularly spaced notches 61, only some of which have been numbered in FIG. 2, and which are disposed longitudinally of the gates or links 57 and 58 on the concave surfaces thereof. The notches 61 provide the means by which each of the gates or links 57 and 58 meshes with a gear 62 to be oscillated or driven clockwise or counterclockwise in a horizontal plane in its respective associated pairs of tubes or conduits 55 and 56. To the end that each gear 62 is rendered operable, it may be mounted on the shaft 63 of a motor 64 which may be operated by hydraulic fluid in lines 65, only a portion of which are shown. Each motor 64 is supported by any conventional means on or adjacent one of the tubes or conduits 55 and 56 of each pair thereof, as illustrated in the drawings.

The connector 48 is operated and operates by connecting in aligned position the rod or arm 49 to vehicle 16 and the rod or arm 50 to the vehicle 17 by securing ears or lugs 51 and 52 to frame lugs or bosses 53. Thereby, the concavities of the arcuate tubes or conduits 55, and the concavities of the arcuate tubes or conduits 56, will be disposed opposite each other. Spacing of the vehicles 16 and 17 must be such that each pair of arcuate tubes or conduits 55 and 56 falls within a circle. Thus aligned, the respective gates or links 57 and 58 can be driven into connecting position, as illustrated in FIG. 1, for example.

Connected together in the fashion illustrated in FIG. 1, the two vehicles 16 and 17 with static conveyor sections 47 in elevated position may pass down the aisles 14 and 15 on opposite sides of the row of trees, for example, row 11. As the connected together vehicles advance to the dotted position illustrated in FIG. 3 in the direction of the arrow 66, a tree 11A will enter the forward opening 59 between the pair of tubes or conduits 55. Thereafter, the link 57 may be rocked or oscillated from its position in FIG. 3 to the position illustrated in FIG. 4 to unblock the opening 60 between the tubes or conduits 55. When the rear opening 60 between the members 55 is unblocked, the vehicles can advance again and the tree 11A will pass relatively rearwardly to the space 70 between the front pair of tubes 55 and the rear pair of tubes 56, as illustrated in FIG. 4 of the drawings.

By spacing the pairs of tubes 55 and 56 longitudinally from each other a distance equal to the spacing of the trees 11A and 11B, tree 11B will be in a position now to enter between the arcuate tubes 55, as illustrated in FIG. 4. From the position of FIG. 4, the gate or link 57 may be moved to again unblock opening 59 between the tubes 55, whereupon, as the vehicles 16 and 17 move forwardly, the tree 11B will pass relatively into the position shown in FIG. 5, whereas the tree 11A will relatively pass from the position shown in FIG. 4 to the position shown in FIG. 5 through the opening 59 between the tubes 56.

Once the connected together vehicles 16 and 17 are in the position illustrated in FIG. 5, the elastomer aprons or conveyor sections 47 of the vehicles 16 and 17 may be lowered to surround the trees 11A and 11B which can then be shaken to loose their crop. By reason of the arrangement of parts, the vehicles 16 and 17 will balance each other and will rock with respect to the connector 48. After the crops from the trees 11A and 11B have been harvested, the sections 47 may be elevated and the combination vehicles 16–17 may be advanced again in the direction of the arrow 66. To the end that the trees 11A and 11B may pass through the device, the gates or links 57 and 58 will be first moved to close their respective openings 59. Thereafter, forward movement of the combined vehicles will place the tree 11B in the space 70, and place the tree 11A in the space 71 to the rear of the tubes 56. At such time, a new tree (not seen) will then occupy the space 72 in front of the tubes 55.

Further operation of the device to effectuate its ends will be obvious from the foregoing description and from the drawings.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A harvesting device for fruits and the like comprising
a pair of bodies adapted to catch fruit and the like, and connector means for securing the bodies together as they are disposed in and move longitudinally of a pair of paths on opposite sides of a row of trees while passing the trees therebetween, said means comprising connectors formed and arranged to resist lateral and vertical shifting between said bodies and being selectively separable to pass trees between said bodies and connectible upon said trees passing by.

2. A fruit catching vehicle and the like comprising a pair of mobile connected together fruit catching bodies having a pair of fruit catching webs extending toward opposite sides of a tree from said bodies, respectively, and adapted thereby to encircle a tree, and a connector mechanism operably connected to and connecting said bodies together and including a movable gate whereby said bodies remain connected together as they move along paths on opposite sides and longitudinally of a row of trees.

3. The fruit catching vehicle defined in claim 2 in which said gate is rotatable.

4. The fruit catching device defined in claim 1 in which said means comprises a connector housing member connected to said bodies and having front and rear openings, and gate means movably carried by said housing member and adapted to close alternate of said openings, thereby to pass a tree between said bodies as they are connected together.

5. The fruit catching device defined in claim 4 in which said gate means includes a gate oscillatable in said housing member to opposite sides of said openings.

6. The device defined in claim 1 in which said means comprises a pair of gate frames defining openings disposed longitudinally of the path of movement of said bodies and spaced from each other, and a gate selectively disposable alternately in said gate openings
whereupon alternate blocking and unblocking of said gate openings a tree may be passed between said vehicles.

7. A connector for securing together a pair of bodies of a fruit harvester to pass therebetween standing trees in an orchard, said connector comprising
a framework defining tree admitting openings spaced apart lengthwise of the harvester;
means for connecting said framework to said pair of bodies on axes extending lengthwise of the harvester to accommodate lateral tilting thereof;
gate means carried on said framework and alternately and selectively disposable about said openings to accommodate passage of trees through said openings, and
means for moving said gate means.

8. The device defined in claim 7 in which said gate means is a curved member generally concentric with the axis of the associated opening selectively rockable to close and open the respective opening.

9. A connector for securing together a pair of bodies to pass therebetween an object, said connector comprising
a framework connected to said bodies;
arcuate gate guide members connected to said framework and defining sectors of openings spaced from each other along the path of movement of the bodies;
curved gates carried by said guide members, and
means for driving the gates to close alternately selected openings.

10. The device defined in claim 9 in which said guide members are arranged in spaced apart pairs.

11. The device defined in claim 9 in which said guide members are arcuate and disposed as spaced apart segments of a circle.

12. The device defined in claim 11 in which said gate is an arcuate arm which is movable in said circular segments.

13. The device defined in claim 9 in which the means for driving the gate comprises a driving gear supported adjacent said gate.

14. The device defined in claim 13 in which said gate has a gear surface in mesh with said gear.

15. A connector for securing together a pair of bodies to pass therebetween a tree and the like, said connector comprising
a pair of parallel rods connected to said bodies, respectively, and extending longitudinally thereof;
a plurality of arcuate gate housing segments disposed in a circle in longitudinally spaced pairs,
said pairs defining front and rear gate openings;
an arcuate gate member oscillatably mounted in selected housing segments, and
drive means supported adjacent said gate member for moving same to block in desired sequence unblocked of said openings,
to permit a tree and the like to pass longitudinally between and relative to said bodies while the same are connected together.

References Cited

UNITED STATES PATENTS

| 2,436,648 | 2/1948 | Isom | 56—329 |
| 2,673,366 | 3/1950 | Johnson | 56—6 X |
| 2,843,273 | 7/1958 | Sanden | 214—15 |

ABRAHAM G. STONE, *Primary Examiner.*

P. A. RAZZANO, *Assistant Examiner.*